(12) United States Patent
Dsouza et al.

(10) Patent No.: US 11,263,022 B2
(45) Date of Patent: Mar. 1, 2022

(54) MECHANISM TO TURN ON/OFF POST-PROCESSING FEATURES IN THE DEVICE MEDIA FOUNDATION TRANSFORM

(71) Applicant: Microsoft Technology Licensing, LLC, Redmond, WA (US)

(72) Inventors: Vivian Dsouza, Bothell, WA (US); Robert D. Young, Kirkland, WA (US); Aleksandar Uzelac, Seattle, WA (US); John G. A. Weiss, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 16/880,072

(22) Filed: May 21, 2020

(65) Prior Publication Data
US 2021/0365271 A1 Nov. 25, 2021

(51) Int. Cl.
G06F 9/4401 (2018.01)
H04N 5/262 (2006.01)
G06F 9/54 (2006.01)
G06F 9/445 (2018.01)

(52) U.S. Cl.
CPC ........ *G06F 9/4411* (2013.01); *G06F 9/44505* (2013.01); *G06F 9/547* (2013.01); *H04N 5/2621* (2013.01)

(58) Field of Classification Search
CPC ..... G06F 9/44505; G06F 9/4411; G06F 9/547
See application file for complete search history.

(56) References Cited

U.S. PATENT DOCUMENTS

| | | |
|---|---|---|
| 9,583,140 B1 | 2/2017 | Rady |
| 2008/0298571 A1 | 12/2008 | Kurtz et al. |
| 2016/0210159 A1* | 7/2016 | Wilson ................. G06F 9/4411 |
| 2018/0124270 A1* | 5/2018 | Kanumuri ............ G06F 9/4411 |
| 2019/0256869 A1* | 8/2019 | Doudna ................. A61P 31/12 |
| 2020/0143520 A1* | 5/2020 | Suszek ..................... G06T 5/50 |
| 2020/0145664 A1* | 5/2020 | Dinu ................... H04N 19/105 |

OTHER PUBLICATIONS

Microsoft, "How to customize camera options with a UWP device app" (Apr. 20, 2017), pp. 1-13, [retrieved from https://docs.microsoft.com/en-us/windows-hardware/drivers/devapps/how-to-customize-camera-options].*
Microsoft, "Device MFT design guide" (Jan. 30, 2018), pp. 1-15 [retrieved from https://docs.microsoft.com/en-us/windows-hardware/drivers/stream/dmft-design].*
Drewbatgit, et al.,"Media Foundation and COM", Retrieved From: https://docs.microsoft.com/en-us/windows/win32/medfound/media-foundation-and-com, May 31, 2018, 6 Pages.

(Continued)

*Primary Examiner* — Brian W Wathen
(74) *Attorney, Agent, or Firm* — International IP Law Group, PLLC

(57) ABSTRACT

In an embodiment described herein, a method for a mechanism to turn a post processing feature in the Device Media Foundation Transform is described. The method comprises managing, at a device integration service executing on a computing device, a current setting of a feature and updating the current setting as stored in a registry in response to a changed setting of the feature and asserting a setting changed event. The method also includes applying the updated current setting to captured media samples via the Device Media Foundation Transform in response to the asserted setting changed event.

17 Claims, 7 Drawing Sheets

(56) References Cited

OTHER PUBLICATIONS

Drewbatgit, et al.,"Handling Stream Changes", Retrieved From: https://docs.microsoft.com/en-us/windows/win32/medfound/handling-stream-changes, May 31, 2018, 5 Pages.

"International Search Report and Written Opinion Issued in PCT Application No. PCT/US21/026742", dated Jun. 17, 2021, 11 Pages.

"Extended camera controls", Retrieved from: https://docs.microsoft.com/en-us/windows-hardware/drivers/stream/standardized-extended-controls-, Apr. 20, 2017, 8 pages.

"Eye control troubleshooting guide", Retrieved from: https://support.microsoft.com/en-in/help/4511874/windows-10-eye-control-troubleshooting-guide, Retrieved Date: Apr. 7, 2020, 12 Pages.

Dilger, Daniel Eran, "Apple's iOS 13 beta 3 FaceTime gaze magic is triumph of tech evolution", Retrieved from https://appleinsider.com/articles/19/07/04/apples-ios-13-beta-3-facetime-gaze-magic-is-triumph-of-tech-evolution, Jul. 4, 2019, 12 Pages.

Horwitz, Jeremy, "iOS 13 FaceTime 'correction' uses ARKit 3 to make eyes look straight ahead", Retrieved from https://venturebeat.com/2019/07/03/ios-13-facetime-correction-uses-arkit-3-to-make-eyes-look-straight-ahead/, Jul. 3, 2019, 2 Pages.

Protalinski, Emil, "Microsoft's AI-powered eye gaze tech is exclusive to the Surface Pro X", Retrieved from: https://venturebeat.com/2019/10/03/microsofts-ai-powered-eye-gaze-tech-is-exclusive-to-the-surface-pro-x/, Oct. 3, 2019, 3 Pages.

Satran, et al., "Using the Video Mixer Controls", Retrieved from: https://docs.microsoft.com/en-us/windows/win32/medfound/using-the-video-mixer-controls, May 31, 2018, 5 Pages.

\* cited by examiner

MECHANISM TO TURN ON/OFF POST-PROCESSING FEATURES IN THE DEVICE MEDIA FOUNDATION TRANSFORM

BACKGROUND

A media foundation transform (MFT) is a model that processes media data and is included in a media foundation architecture. An MFT may include one or more decoders, encoders, converters, scalers, multiplexers, demultiplexers, and the like for managing input media data. An MFT has one or more input streams of data and one or more output streams that produce data. Applications use predefined interfaces to access post-processing provided by the MFT.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for a mechanism to turn on/off post-processing features in the Device Media Foundation Transform is described. The method comprises managing, at a device integration service executing on a computing device, a current setting of a feature and updating the current setting as stored in a registry in response to a changed setting of the feature and asserting a setting changed event. The method also includes applying the updated current setting to captured media samples via the Device Media Foundation Transform in response to the asserted setting changed event.

In another embodiment described herein, a system for a mechanism to turn on/off post-processing features in the Device Media Foundation Transform is described. The system comprises a device application, wherein a user accesses a setting of a feature at the device application and a device integration service, wherein the device integration service asserts a setting changed event and updates a current setting as stored in a registry in response to the user changing the setting of the feature. The system also comprises a Device Media Foundation Transformation to apply the updated current setting to captured media samples in response to the asserted setting changed event.

In an additional embodiment described herein, a computer readable medium bearing computer executable instructions which, when executed on a computing system comprising at least a processor, carry out a method for a mechanism to turn on/off post-processing features in the Device Media Foundation Transform is described. The method comprises managing, at a device integration service executing on a computing device, a current setting of a feature and updating the current setting as stored in a registry in response to a changed setting of the feature and asserting a setting changed event. The method also includes applying the updated current setting to captured media samples via the Device Media Foundation Transform in response to the asserted setting changed event.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
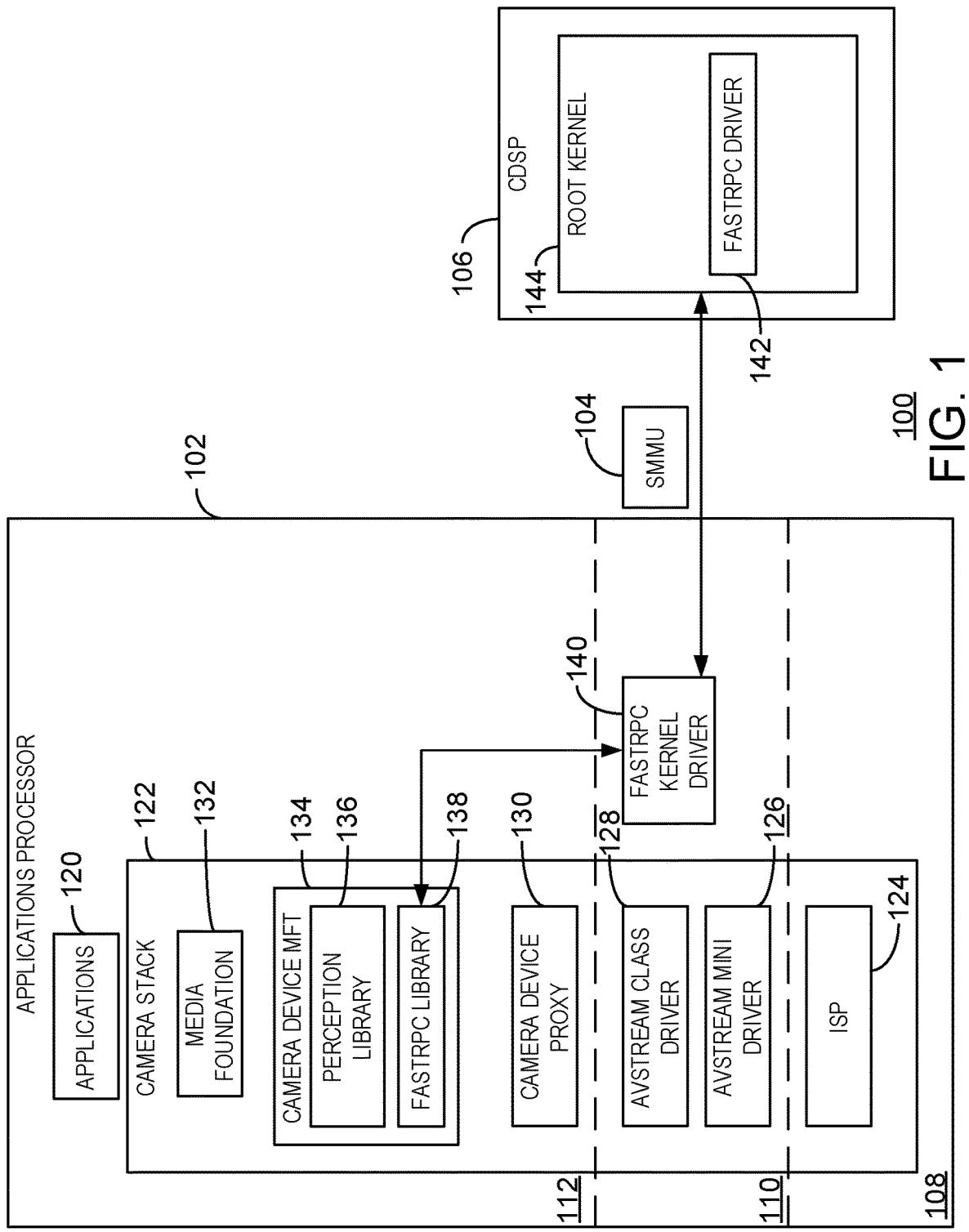
FIG. 1 is a block diagram of an example system for a mechanism to turn on/off post-processing features in the Device Media Foundation Transform.

A Device Media Foundation Transform (DMFT) is a particular media foundation transform (MFT) that provides global access to commonly used media features, such as video editing, image preview, and image stabilization, across all applications executing on a platform. The DMFT described herein is encapsulated within the camera driver stack and used for post processing video frames obtained from an image capture mechanism, such as a camera. The DMFT is a user-mode extension to the camera driver stack, and receives post processed frames from the camera. The camera driver stack may dictate several aspects of video capture, including acceptable video sources, display options, formats, and compression options. The DMFT may be applied to all data streams from the camera, and can output any number of output streams.

The DMFT may process data in response to predefined calls. For example, the DMFT is accessed using an application programming interface (API) or a device driver interface (DDI). The DMFT does not make calls to the camera, rather, the DMFT is a state machine that stores very little data. An application can interface with the DMFT only via a predefined application programming interface (API) or a device driver interface (DDI). Users cannot alter the behavior or effects of the DFMT on a video stream.

The present techniques enable a mechanism to turn on/off post-processing features in the Device Media Foundation Transform. In examples, features may include but are not limited to eye gaze correction, background blur, or any combination thereof. As used herein, each of the eye gaze correction and background blur are additional post processing operations applied to frames of captured video data. The eye gaze correction and background blur may be referred to generally as features. In some cases, eye gaze correction and background blur are artificial intelligence (AI) based features. The DMFT may receive post-processed frames from the camera device and apply additional post processing operations applied to frames of captured video data. In embodiments, a device integration service notifies the DMFT when a user has changed the setting of a feature. The settings of the features may be accessed by a user via a device application. In embodiments, the device application may include a toggle for each feature. For example, within the device application, the eye gaze correction has an ON/OFF setting and the background blur has an ON/OFF setting. A user may change or update each setting within the device application as needed. The device application then notifies the device integration service of the change or update of the setting, and the device integration service may then determine if the selected, updated setting represents a change from the current setting. In response to a change from the current setting, the DMFT is notified to apply additional post-processing to the streams of video data according to the updated setting.

In this manner, all applications have access to eye gaze correction and background blur features without a change to the respective application's code. All post processing is completed by the DMFT. As a result, the user experience with the platform is enhanced as all applications executing on the platform benefit from the additional features. For example, applications that rely on video capture, such as blogging, social media, and videoconferencing applications, benefit from the ability to correct the eye gaze of a user and blur the background of a user. As used herein, eye gaze correction refers to a modification of a captured video stream to make it appear as though a user in the video stream is looking directly at the camera. Eye gaze correction creates a feeling of looking eye-to-eye with the user captured in the video stream, rather than the user looking away or being otherwise distracted. Background blur refers to the modification of the background portion of a capture video stream to obscure the background. Background blur enables the use of video capture applications without concern for unsavory or inappropriate items in the background of the captured video.

While particular post processing features have been described, they should not be viewed as limiting to the present techniques. Rather, the present techniques enable an extension of the DMFT to include additional post processing features without direct user access to the DMFT. Moreover, the DMFT is not tasked with maintaining any registry or state with regard to the additional post processing features.

Figure 6:
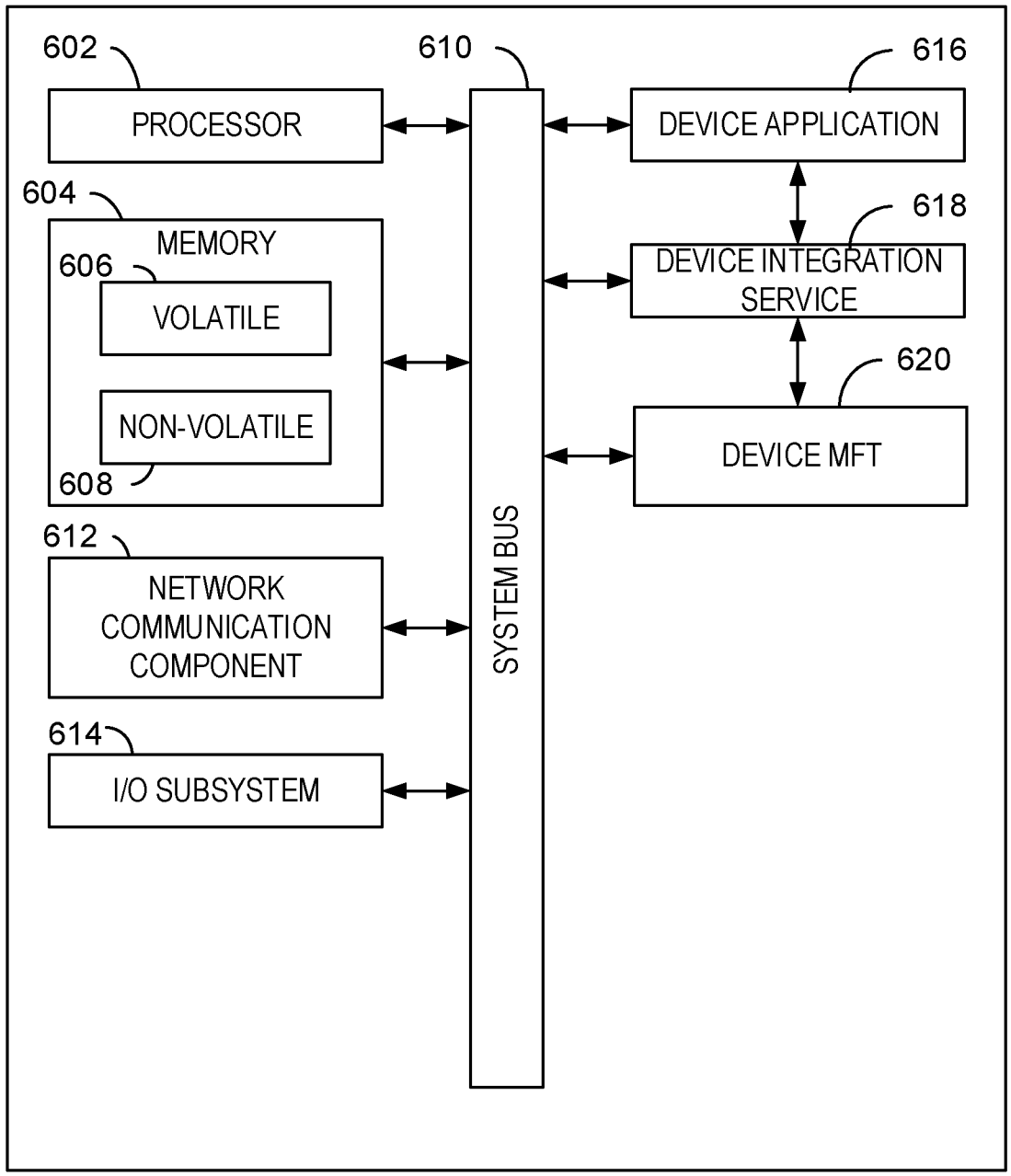
FIG. 6 is a block diagram illustrating an exemplary computing device that enables a mechanism to turn on/off post-processing features in the Device Media Foundation Transform.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 6 discussed below, provides details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like. The communication media may include cables, such as fiber optic cables, coaxial cables, twisted-pair cables, and the like. Moreover, transmission media for wireless signals may include hardware that enables the transmission of wireless signals such as broadcast radio waves, cellular radio waves, microwaves, and infrared signals. In some cases, the transmission media for wireless signals is a component of a physical layer of a networking stack of an electronic device.

FIG. 1 is a block diagram of an example system 100 for a mechanism to turn on/off eye gaze correction and background blur in the Device Media Foundation Transform. The system of FIG. 1 may be implemented using the method 400 of FIG. 4, or within the networked environment 700 of FIG. 7.

The example system 100 includes an applications processor 102, a system memory management unit (SMMU) 104, and a compute digital signal processor (CDSP) 106. In embodiments, the applications processor 102 may execute code to provide global access to the features described herein. The applications processor 102 may operate in each of a user mode 112 and a kernel mode 110 on a hardware layer 108. The application processor 102 may switch between the two modes depending on what type of code is executing on the processor. For example, applications 120 execute in user mode 112, and core operating system components execute in the kernel mode 110.

Generally, the present techniques enable a mechanism for a user to toggle video post-processing features. The present techniques enable a dynamic change to a video stream via a DSP. The eye gaze correction or background blur are enabled instream by offloading the video stream to the compute digital signal processor (CDSP) 106. The eye gaze correction or background blur may be applied in real time at the CDSP 106 and made immediately visible to the user. The applications 120 may be unaware of the changes made to the video stream to correct features such as eye gaze and background blur. In embodiments, the features are enabled via a user mode setting.

Applications 120 may include applications that rely on the camera to capture video streams, such as such as videoconferencing, social media, and blogging applications. Applications 120 execute within the user mode 108 of the processor 102. The applications 120 may be communicatively coupled with a camera stack 122. As illustrated, the camera stack includes components that operate within each of the user mode 112 and the kernel mode 110 and execute via the hardware layer 108.

At the base level, the camera stack 122 is enabled via an image signal processor (ISP) 124. Within the kernel mode 110, the camera stack includes an audio/video (AV) stream mini driver 126 and an AV stream class driver 128. Generally, the AV stream mini driver 126 may perform functions that are unique or necessary for the particular corresponding hardware. The AV stream class driver 128 performs functions that are not dependent upon the particular corresponding hardware. The drivers 126 and 128 provide a software interface to the hardware of the camera device, enabling the operating systems and other computer programs to access the hardware functions without needing to know precise details of the hardware.

In operations, a media capture stream captured by a camera is processed by the drivers 126 and 128. Samples from the media capture stream may be transmitted to the camera device proxy 130. In embodiments, the camera device proxy 130 is an asynchronous media foundation transform (MFT) that marshals commands and video frames from the drivers 126 and 128. The frames may be placed in a buffer. In embodiments, the buffer is an NV12 buffer.

Within the user mode 112, the camera stack includes a media foundation 132. In embodiments, the media foundation is a multimedia framework that processes media and provides support for various media formats and associated protocols. The media foundation 132 defines the source types, transforms, and media sinks used for a video processing task. The media foundation 132 may generate a pipeline of the appropriate components to complete the video processing task. The media foundation 132 as described herein enables post-processing tasks that include eye gaze correction and background blur. Accordingly, the media foundation 132 generates a pipeline of the appropriate components used to modify a video stream to correct eye gaze and implements background blur functionality. The camera DMFT 134 includes the particular transforms necessary to enable eye gaze correction and background blur functionality. In particular, the DMFT 134 includes a perception library 136 and a FASTRPC library 138. The perception library 134 is a processing library that accesses the NV12 buffer containing media capture samples and offloads processing of the captured media samples to the CDSP 106. The FASTRPC library 138 enables the offloading of feature processing via remote procedure calls. The eye-gaze correction and background blur are applied in stream at the CDSP 106. By automatically offloading feature processing to a DSP, the present techniques enable real-time processing of captured media samples. Additionally, power consumption is reduced by offloading feature processing from the application processor to a DSP, and performance (such as speed and processing power) may increase as a result of offloading feature processing from the application processor to a DSP. Further, the DMFT can enable various post-processing features without maintaining a status of the features or directly processing captured media samples to implement the features.

For ease of description, remote procedure calls are used to describe the communications for offloading processing of the video streams to the CDSP 106. However, any communication protocol may be used. Accordingly, various libraries may be used to offload video streams for further processing and the libraries used are not limited to the type described herein.

To offload processing of the media capture samples, the FASTRPC library 138 issues a fast remote procedure call (RPC) to the FASTRPC kernel driver 140 within the kernel mode 110. A pointer to each frame in the frame buffer may be propagated through the FASTRPC kernel driver 140 to a FASTRPC driver 142 of a root kernel 144 executing on the CDSP 106. The pointers may be managed by the system memory management unit (SMMU) 104. In embodiments, the CDSP 106 is a DSP that executes via its own, independent operating system. A binary communication protocol is used to offload captures media sample processing to the CDSP. In examples, the remote procedure call scheme described herein is a generalized implementation of a binary wire protocol. Generally, the present techniques enable the application of video features to captured media samples by offloading the processing to a DSP. In embodiments, the DSP executes its own operating system, and access to processing by the DSP is provided through one or more RPCs. Alternatively, the DSP is directly accessible from CPU and an RPC is not needed.

The diagram of FIG. 1 is not intended to indicate that the example system 100 is to include all of the components shown in FIG. 1. Rather, the example system 100 can be implemented using fewer or additional components not illustrated in FIG. 1 (e.g., additional components, processes, conversions, coders, etc.).

Figure 2:
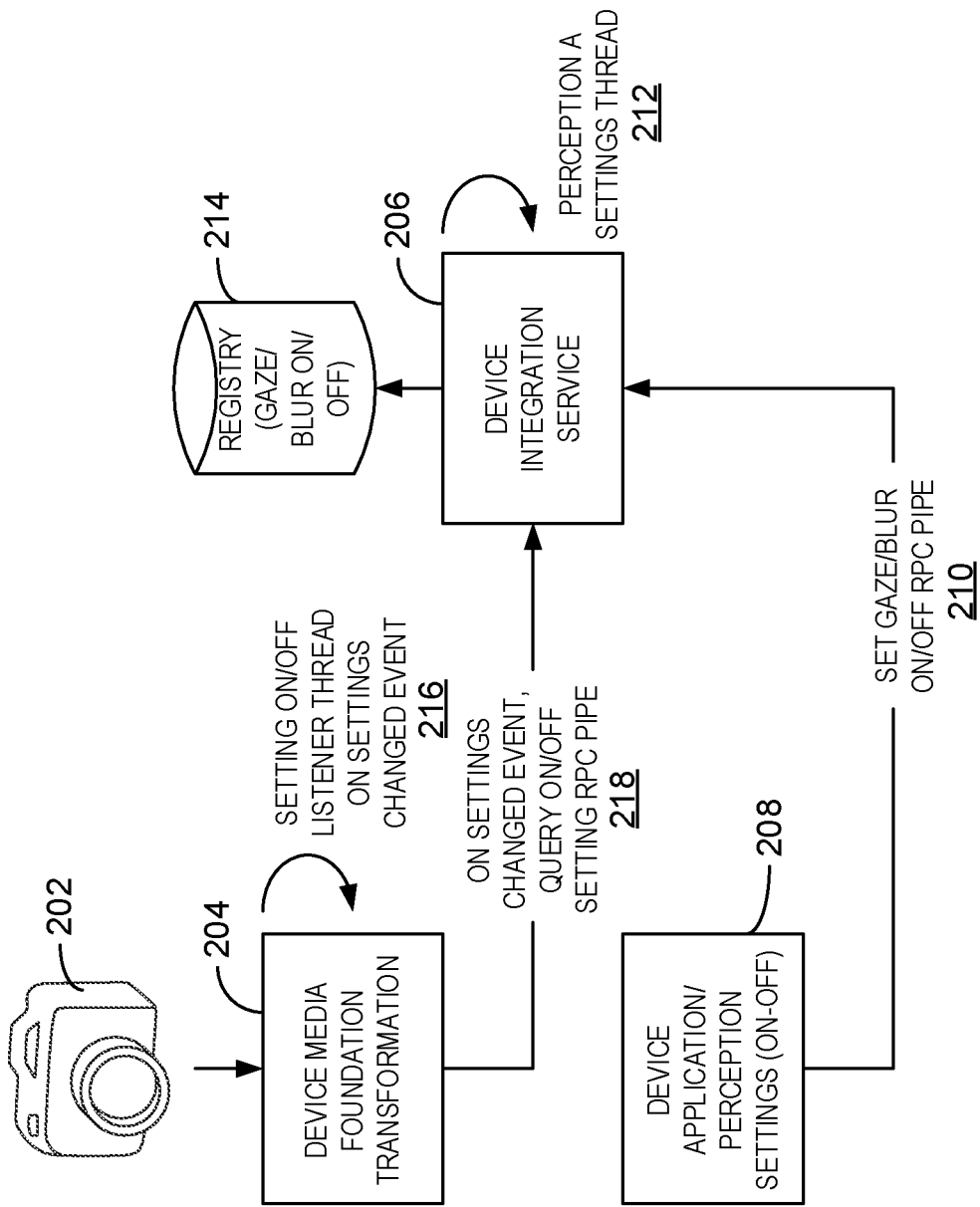
FIG. 2 is a block diagram of a mechanism to turn on/off post-processing features in the Device Media Foundation Transform.

FIG. 2 is a block diagram of a mechanism 200 to turn on/off eye gaze correction and background blur in the Device Media Foundation Transform. The mechanism 200 of FIG. 2 may be implemented using the system 100 of FIG. 1, the method 400 of FIG. 4, the computer readable media 600 of FIG. 6, or within the networked environment 700 of FIG. 7.

The mechanism 200 is a custom protocol that enables allows artificial intelligence (AI) based features such as eye gaze correction and background blur to be enabled and disabled in the DMFT without requiring applications to write new code. The mechanism 200 involves providing a global setting that can be toggled by an end user, and based on that trigger the DMFT will implement the features on demand, in real-time.

A camera 202 is illustrated providing input to a Device Media Foundation Transform 204. As discussed above, the captured media samples may be processed and stored in a buffer for further processing by the DMFT 204. A device integration service 206 and a device application 208 are also illustrated. In embodiments, the device integration service 206 maintains a registry that contains the current setting of the features. In embodiments, the current setting of the features indicates whether a feature is presently set to ON or OFF. Put another way, the current setting indicates if the feature is currently being applied to captured media samples. If the current feature is ON, the feature is currently being applied to captured media samples, regardless of the particular application used to capture the media frames. If the current feature is OFF, the feature is not currently being applied to the captured media samples. The device integration service also provides an RPC interface for the DMFT 204 to call and fetch the current state of a requested feature.

The device application 208 provides a user interface where a user can turn the features on or off as desired. As a user selects a particular feature setting, a remote procedure call (RPC) 210 is sent to the device integration service 206. The device integration service 206 includes a management thread 212 and accesses a registry 214 in response to the RPC 210. The management thread 212 determines if the setting selected by the user that triggered the RPC 210 is a change to the current setting of the feature. The registry 214 stores a current setting for one or more features. Accordingly, the registry 214 stores a current setting for the eye-gaze correct and a current setting for the background blur. As described herein, the device integration service 206 maintains the registry 214. By using the device integration service to maintain the registry, the DMFT 204 can enable the toggle of post-processing features without additional APIs, DDIs, or other interfaces for accessing the post-processing features.

When the selected user setting is different from the current setting stored in the registry 214, the management thread 212 issues a setting changed event to the DMFT 204. The DMFT 204 includes a listener thread 216 that listens for the global state change notification and is configured to receive the setting changed event from the management thread 212. In response to a setting changed event, the DMFT will query the current setting from the device integration service via an RPC 218. The DMFT then configures frames for processing according to the current setting for each post-processing feature. Accordingly, anytime the device integration service 206 sets the setting changed event, the DMFT 204 will query for the new state and then override the video stream operation with the new user selected mode. This override includes turning ON/OFF eye gaze correction or background blur.

The device application and device integration service enable the DMFT to provide additional post processing features without maintaining a registry or reading from a registry. Accordingly, the additional post processing features described herein are not affected as updates or other modifications are applied to the DMFT. While the techniques described herein modify the DMFT to include a listener thread, the DMFT does not directly communicate with the device application. The user can change settings at the device application without causing any excessive calls to the DMFT. The DMFT is notified in the event that a setting has changed and not in immediate response to the user toggling feature settings. In this manner, processing and power consumed by the DMFT is conserved.

Typically, a DMFT is accessed using a device driver interface (DDI) or an API. The DMFT is a standard component that enables post processing in a standard, predefined manner. Applications wanting to access features provided by the DMFT typically include code to implement the necessary DDI or API for the desired functionality. The applications can directly query the DMFT via the DDI or API. If the DMFT supports the functionality as queried by the application, the DMFT applies post-processing according to its own internal state machines for the particular functionality. However, some applications may not be updated frequently enough or have the capability to implement the DDI or API needed to access the DMFT. Accordingly, applications may use the mechanism described herein without updating or re-writing code. Thus, eye gaze correction or background blur may be enabled as global features without modifying existing frameworks or requiring third party applications to rewrite their code.

The diagram of FIG. 2 is not intended to indicate that the example mechanism 200 is to include all of the components shown in FIG. 2. Rather, the example mechanism 200 can be implemented using fewer or additional components not illustrated in FIG. 2 (e.g., additional components, processes, procedure calls, conversions, coders, etc.).

Figure 3:
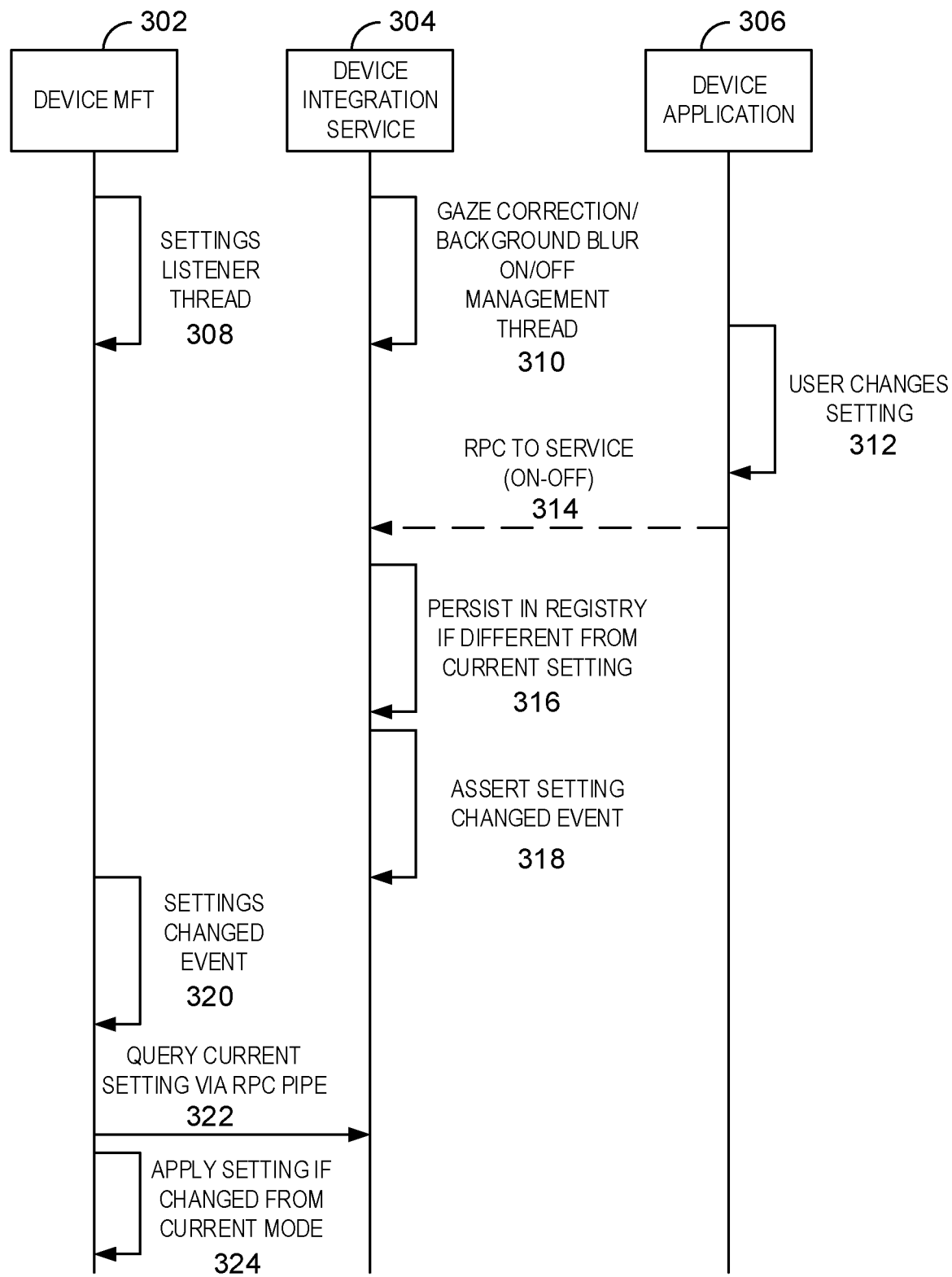
FIG. 3 is a sequence diagram of a mechanism to turn post-processing features in the Device Media Foundation Transform.

FIG. 3 is a sequence diagram 300 of a mechanism to turn on/off eye gaze correction background blur in the Device Media Foundation Transform. FIG. 3 includes a Device Media Foundation Transform 302, a device integration service 304, and a device application 306.

At reference number 308, the settings listener thread of the DMFT 302 continuously waits for an event from the device integration service that indicates a change in a post processing setting. For example, the listener thread may continuously wait for a change in a post processing setting during a particular time period, such as when post-processing feature settings are accessed in the device application. Additionally, in examples the listener thread may continuously wait for a change in a post processing setting during a particular time period when a registry is updated based on a change in the registry settings corresponding to a post-processing feature. By using the settings listener thread, the DMFT avoids maintaining or interpreting any post-processing feature setting as toggled by a user. Instead, the DMFT offloads post-processing as indicated by the device integration service. Simultaneously, at reference number 310 a gaze correction/background blur on/off management thread of the device integration service 304 manages a registry that includes the current state of post-processing features, listens for a setting change at the device application, and compares a received changed setting to the registry.

At reference number 312, a user selects a setting of a post processing feature. The post processing feature may be, for example, eye gaze correction or background blur. In response to the selected, updated setting, at reference number 314 the device application 306 issues an RPC to the device integration service. At reference number 316, the device integration service 304 stores the selected setting in the registry if the selected setting differs from the current setting. In this manner, the selected setting from reference number 312 persists in the registry. At reference number 318, the device integration service asserts a setting changed event. The settings listener thread of the Device Media Foundation Transform 302 is notified of the setting changed event at reference number 320. At reference number 322, the Device Media Foundation Transform 302 queries the device integration service for the current setting via a remote procedure protocol pipeline. At reference number 324, the Device Media Foundation Transform 302 applies the current setting if it is changed. In embodiments, the Device Media Foundation Transform 302 enables or disables the feature according to the device integration service's response to the Device Media Foundation Transform 302 query at reference number 322.

Figure 4:
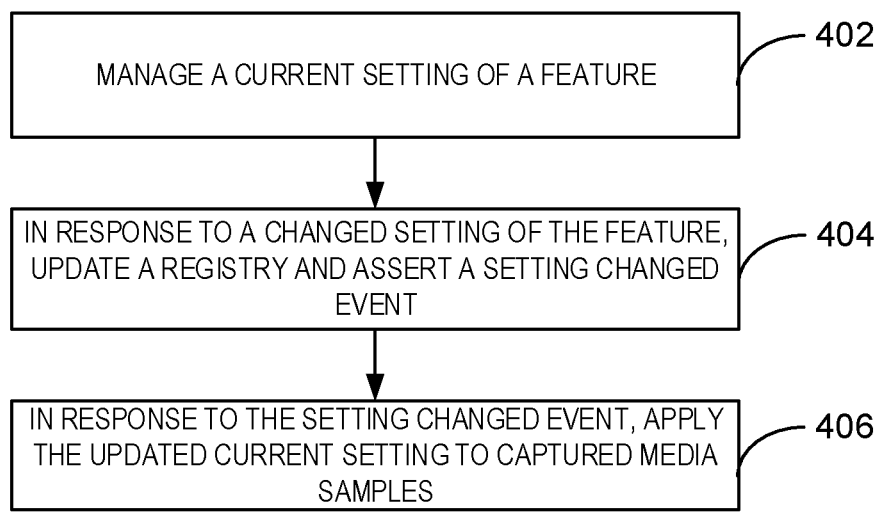
FIG. 4 is a process flow diagram of a method for a mechanism to turn on/off post-processing features in the Device Media Foundation Transform.

FIG. 4 is a process flow diagram of a method 400 for a mechanism to turn on/off eye gaze correction or background blur in the Device Media Foundation Transform. The method 400 of FIG. 4 may be implemented using the system 100 of FIG. 1, mechanism 200 of FIG. 2, the computer readable media 600 of FIG. 6, or within the networked environment 700 of FIG. 7.

At block 402, a current setting of a feature is managed. In embodiments, features include eye gaze correction, background blur, or any combinations thereof. Managing the current setting of the feature may include maintaining a registry that comprises the current setting of all features enabled by the DMFT.

At block 404, in response to a changed setting of the feature, a registry comprising the current setting of the feature is updated and a setting changed event is asserted. In embodiments, the changed setting of the feature is an update or toggle of the feature that does not match the current setting of the feature as stored in the registry.

At block 406, in response to the setting changed event, a device media transform applies the updated current setting to captured media samples.

In one embodiment, the process flow diagram of FIG. 4 is intended to indicate that the steps of the method 400 are to be executed in a particular order. Alternatively, in other embodiments, the steps of the method 400 can be executed in any suitable order and any suitable number of the steps of the method 400 can be included. Further, any number of additional steps may be included within the method 400, depending on the specific application.

The present techniques provide a mechanism that enables a feature to be enabled within the Device Media Foundation Transform using global settings in the operating system. Traditionally, the Device Media Foundation Transform is limited to use as a post processing component for outgoing video frames from the Media Foundation pipeline. The present techniques enable a global setting option for users to opt-in/out of the experience. Moreover, the current application ecosystem does not need changes to the current code to benefit from the expanded post processing functionality provided according to the present techniques.

Figure 5:
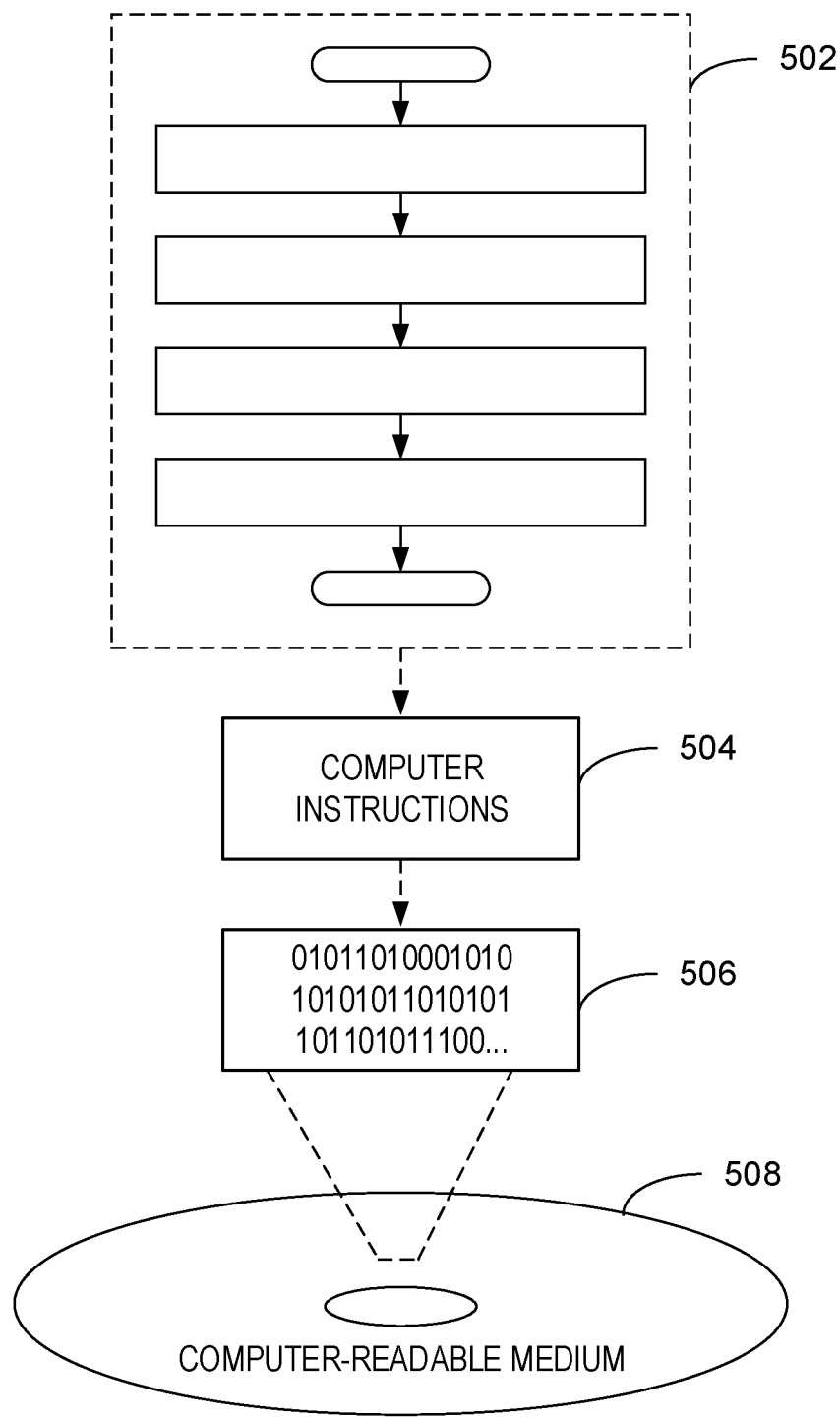
FIG. 5 is a block diagram illustrating an exemplary computer readable medium encoded with instructions to a mechanism to turn on/off post-processing features in the Device Media Foundation Transform.

Turning to FIG. 5, FIG. 5 is a block diagram illustrating an exemplary computer readable medium encoded with instructions to a mechanism to turn on/off eye gaze correction background blur in the Device Media Foundation Transform according to aspects of the disclosed subject matter. More particularly, the implementation 500 comprises a computer-readable medium 508 (e.g., a CD-R, DVD-R or a platter of a hard disk drive), on which is encoded computer-readable data 506. This computer-readable data 506 in turn comprises a set of computer instructions 504 configured to operate according to one or more of the principles set forth herein. In one such embodiment 502, the processor-executable instructions 504 may be configured to perform a method, such as at least some of the exemplary method 400 of FIG. 4, for example. In another such embodiment, the processor-executable instructions 504 may be configured to implement a system, such as at least some of the exemplary system 600 of FIG. 6, as described below. Many such computer-readable media may be devised by those of ordinary skill in the art that are configured to operate in accordance with the techniques presented herein.

Turning to FIG. 6, FIG. 6 is a block diagram illustrating an exemplary computing device 600 that enables a mechanism to turn on/off eye gaze correction background blur in the Device Media Foundation Transform according to aspects of the disclosed subject matter. The exemplary computing device 600 includes one or more processors (or processing units), such as processor 602, and a memory 604. The processor 602 and memory 604, as well as other components, are interconnected by way of a system bus 610. The memory 604 typically (but not always) comprises both volatile memory 606 and non-volatile memory 608. Volatile memory 606 retains or stores information so long as the memory is supplied with power. By contrast, non-volatile memory 608 is capable of storing (or persisting) information even when a power supply is not available. Generally speaking, RAM and CPU cache memory are examples of volatile memory 606 whereas ROM, solid-state memory devices, memory storage devices, and/or memory cards are examples of non-volatile memory 608.

The processor 602 executes instructions retrieved from the memory 604 (and/or from computer-readable media, such as computer-readable medium 508 of FIG. 5) in carrying out various functions of toggling DFMT post-processing features as described above. The processor 602 may be comprised of any of a number of available processors such as single-processor, multi-processor, single-core units, and multi-core units.

Figure 7:
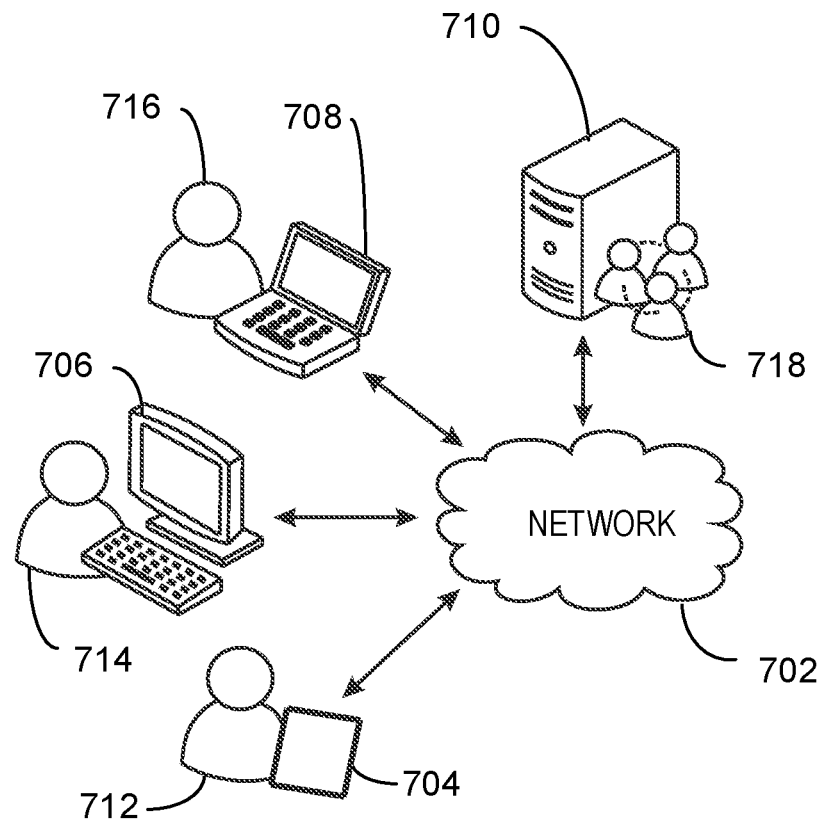
FIG. 7 is a block diagram illustrating an exemplary network environment suitable for implementing aspects of the disclosed subject matter.

Further still, the illustrated computing device 600 includes a network communication component 612 for interconnecting this computing device with other devices and/or services over a computer network, including other user devices, such as user computing devices 704, 706, 708, and 710 as illustrated in FIG. 7. The network communication component 612, sometimes referred to as a network interface card or NIC, communicates over a network (such as network 702) using one or more communication protocols via a physical/tangible (e.g., wired, optical, etc.) connection, a wireless connection, or both. As will be readily appreciated by those skilled in the art, a network communication component, such as network communication component 612, is typically comprised of hardware and/or firmware components (and may also include or comprise executable software components) that transmit and receive digital and/or analog signals over a transmission medium (i.e., the network.)

The computing device 600 also includes an I/O subsystem 614. As will be appreciated, an I/O subsystem comprises a set of hardware, software, and/or firmware components that enable or facilitate inter-communication between a user of the computing device 600 and the processing system of the computing device 600. Indeed, via the I/O subsystem 614 a computer operator may provide input via one or more input channels such as, by way of illustration and not limitation, touch screen/haptic input devices, buttons, pointing devices, audio input, optical input, accelerometers, and the like. Output or presentation of information may be made by way of one or more of display screens (that may or may not be touch-sensitive), speakers, haptic feedback, and the like. As will be readily appreciated, the interaction between the computer operator and the computing device 600 is enabled via the I/O subsystem 614 of the computing device.

The computing device 600 further comprises a device application 616, a device integration service 618, and a Device Media Foundation Transform 620. In operation/execution, the device application 616 enables a user to toggle a setting of a video post-processing feature. The device integration service 618 receives the setting from the device application 616. A management thread of the device integration service 618 manages the current setting of the feature. Managing the current setting of the feature includes . . . .

The device integration service 618 also asserts a changed setting event when the current setting is changed in response to a user toggling a setting of the video post processing feature at the device application 616. A listener thread of the Device Media Foundation Transform 620 listens for the setting changed event. In response to the setting changed event, the Device Media Foundation Transform 620 applies the updated current setting to captured media samples.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the device application 616, device integration service 618, and Device Media Foundation Transform 620 may be partially, or entirely, implemented in hardware and/or in the processor 602. For example, the functionality may be implemented with an application specific integrated circuit, in logic implemented in the processor 602, or in any other device.

Turning now to FIG. 7, FIG. 7 is a block diagram illustrating an exemplary network environment 700 suitable for implementing aspects of the disclosed subject matter. The network environment 700 includes user computers 704, 706, 708, and 710. Each user computer corresponds to one or more computer users. Thus, user computers 704, 706, 708, and 710 correspond to computer users 712, 714, 716, and 718, respectively. As suggested above, a computer user, such as computer user 714, may be engaging in video conferencing call across network 702 via the corresponding user computer 706. In an example, the user computer 706 may apply video post-processing to captured media data captured via the mechanism to turn on/off eye gaze correction or background blur in the Device Media Foundation Transform. The processed media data may be transmitted across the network 702 to user computers 704, 708, and 710. A device application, device integration service, and Device Media Foundation Transform may execute on each of the user computers 704, 706, 708, and 710 to turn on/off eye gaze correction or background blur in the Device Media Foundation Transform as described herein.

While various novel aspects of the disclosed subject matter have been described, it should be appreciated that these aspects are exemplary and should not be construed as limiting. Variations and alterations to the various aspects may be made without departing from the scope of the disclosed subject matter.

EXAMPLES

Example 1 is a method for a mechanism to turn on/off a post-processing feature in the Device Media Foundation Transform. The method includes managing, at a device integration service executing on a computing device, a current setting of a feature and updating the current setting as stored in a registry in response to a changed setting of the feature and asserting a setting changed event. The method also includes applying the updated current setting to captured media samples via the Device Media Foundation Transform in response to the asserted setting changed event.

Example 2 includes the method of example 1, including or excluding optional features. In this example, the Device Media Foundation Transform comprises a listener thread that continuously waits for the setting changed event from the device integration service during a particular time period.

Example 3 includes the method of any one of examples 1 to 2, including or excluding optional features. In this example, the current setting of the feature is obtained by the device integration service from a device application.

Example 4 includes the method of any one of examples 1 to 3, including or excluding optional features. In this example, the Device Media Foundation Transform applies the updated current setting to captured media samples by offloading the processing of the samples to a digital signal processor.

Example 5 includes the method of any one of examples 1 to 4, including or excluding optional features. In this example, the device integration service comprises a management thread to listen for a current setting of the feature.

Example 6 includes the method of any one of examples 1 to 5, including or excluding optional features. In this example, the feature is eye gaze correction, background blur, or any combination thereof.

Example 7 includes the method of any one of examples 1 to 6, including or excluding optional features. In this example, an application receives modified captured media samples, wherein the captured media samples are processed according to the updated current setting of the feature.

Example 8 is a system for a mechanism to turn on/off a post-processing feature in the Device Media Foundation Transform. The system includes a device application, wherein a user accesses a setting of a feature at the device application and a device integration service, wherein the device integration service asserts a setting changed event and updates a current setting as stored in a registry in response to the user changing the setting of the feature. The system also includes a Device Media Foundation Transformation to apply the updated current setting to captured media samples in response to the asserted setting changed event.

Example 9 includes the system of example 8, including or excluding optional features. In this example, the Device Media Foundation Transform comprises a listener thread that continuously waits for the setting changed event from the device integration service during a particular time period.

Example 10 includes the system of any one of examples 8 to 9, including or excluding optional features. In this example, the current setting of the feature is obtained by the device integration service from the device application using a remote procedure call.

Example 11 includes the system of any one of examples 8 to 10, including or excluding optional features. In this example, the Device Media Foundation Transform applies the updated current setting to captured media samples by offloading the processing of the samples to a digital signal processor.

Example 12 includes the system of any one of examples 8 to 11, including or excluding optional features. In this example, the device integration service comprises a management thread to listen for a change of the current setting of the feature.

Example 13 includes the system of any one of examples 8 to 12, including or excluding optional features. In this example, the feature is eye gaze correction, background blur, or any combination thereof.

Example 14 includes the system of any one of examples 8 to 13, including or excluding optional features. In this example, an application receives modified captured media samples, wherein the captured media samples are processed according to the updated current setting of the feature.

Example 15 is a computer readable medium bearing computer executable instructions. The computer-readable medium includes instructions that direct the processor to manage, at a device integration service executing on a computing device, a current setting of a feature and update the current setting as stored in a registry in response to a changed setting of the feature and asserting a setting changed event. The computer-readable medium includes instructions that direct the processor to also apply the updated current setting to captured media samples via the Device Media Foundation Transform in response to the asserted setting changed event.

Example 16 includes the computer-readable medium of example 15, including or excluding optional features. In this example, the Device Media Foundation Transform comprises a listener thread that continuously waits for the setting changed event from the device integration service during a particular time period.

Example 17 includes the computer-readable medium of any one of examples 15 to 16, including or excluding optional features. In this example, the current setting of the feature is obtained by the device integration service from a device application.

Example 18 includes the computer-readable medium of any one of examples 15 to 17, including or excluding optional features. In this example, the Device Media Foundation Transform applies the updated current setting to captured media samples by offloading the processing of the samples to a digital signal processor.

Example 19 includes the computer-readable medium of any one of examples 15 to 18, including or excluding optional features. In this example, the device integration service comprises a management thread to listen for a current setting of the feature.

Example 20 includes the computer-readable medium of any one of examples 15 to 19, including or excluding optional features. In this example, the feature is eye gaze correction, background blur, or any combination thereof.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for a mechanism to turn on/off a post-processing feature in a Device Media Foundation Transform, comprising:
    managing, at a device integration service executing on a computing device, a current setting of a post-processing feature;
    listening, via a management thread of the device integration service, for a change in a setting of the post-processing feature;
    in response to the change in the setting of the post-processing feature, updating the current setting as stored in a registry and asserting a setting changed event; and in response to the asserted setting changed event, applying the updated current setting to captured media samples via a Device Media Foundation Transform.

2. The method of claim 1, wherein the Device Media Foundation Transform comprises a listener thread that continuously waits for the setting changed event from the device integration service during a particular time period.

3. The method of claim 1, wherein listening, via the management thread, for the change in the setting of the post-processing feature comprises:
obtaining the setting of the post-processing feature from a device application; and
determining whether the setting comprises a change compared to the current setting as stored in the registry.

4. The method of claim 1, wherein the Device Media Foundation Transform applies the updated current setting to the captured media samples by offloading the processing of the captured media samples to a digital signal processor.

5. The method of claim 1, wherein the post-processing feature is eye gaze correction, background blur, or any combination thereof.

6. The method of claim 1, wherein an application receives modified captured media samples, wherein the captured media samples are processed according to the updated current setting of the post-processing feature.

7. A system for a mechanism to turn on/off a post-processing feature in a Device Media Foundation Transform, comprising:
a device application comprising a setting of a post-processing feature at the device application;
a device integration service configured to:
listen, via a management thread of the device integration service, for a change in the setting of the post-processing feature at the device application;
in response to the change in the setting, update a current setting of the post-processing feature as stored in a registry according to the setting of the post-processing feature in the device application; and
assert a setting changed event; and
a Device Media Foundation Transformation configured to apply the updated current setting to captured media samples in response to the asserted setting changed event.

8. The system of claim 7, wherein the Device Media Foundation Transform comprises a listener thread that continuously waits for the setting changed event from the device integration service during a particular time period.

9. The system of claim 7, wherein the current setting of the post-processing feature is obtained by the device integration service from the device application using a remote procedure call.

10. The system of claim 7, wherein the Device Media Foundation Transform applies the updated current setting to the captured media samples by offloading the processing of the captured media samples to a digital signal processor.

11. The system of claim 7, wherein the post-processing feature is eye gaze correction, background blur, or any combination thereof.

12. The system of claim 7, wherein an application receives modified captured media samples, wherein the captured media samples are processed according to the updated current setting of the post-processing feature.

13. A computer readable medium bearing computer executable instructions which, when executed on a computing system comprising at least a processor, carry out a method for a mechanism to turn on/off a post-processing feature in a Device Media Foundation Transform, the method comprising:
managing, at a device integration service executing on a computing device, a current setting of a post-processing feature;
listening, via a management thread of the device integration service, for a change in a setting of the post-processing feature;
in response to the change in the setting, updating the current setting of the post-processing feature as stored in a registry and asserting a setting changed event; and
in response to the asserted setting changed event, applying the updated current setting to captured media samples via the Device Media Foundation Transform.

14. The computer readable medium of claim 13, wherein the Device Media Foundation Transform comprises a listener thread that continuously waits for the setting changed event from the device integration service during a particular time period.

15. The computer readable medium of 13, wherein listening, via the management thread, for the change in the setting of the post-processing feature comprises:
obtaining the setting of the post-processing feature from a device application; and
determining whether the setting comprises a change compared to the setting as stored in the registry.

16. The computer readable medium of claim 13, wherein the Device Media Foundation Transform applies the updated current setting to the captured media samples by offloading the processing of the captured media samples to a digital signal processor.

17. The computer readable medium of claim 13, wherein the post-processing feature is eye gaze correction, background blur, or any combination thereof.

* * * * *